(12) United States Patent
Flemming et al.

(10) Patent No.: US 12,330,486 B2
(45) Date of Patent: Jun. 17, 2025

(54) RECONFIGURABLE INFLATABLE PICKUP TRUCK BOX COVER

(71) Applicant: GM Global Technology Operations LLC, Detroit, MI (US)

(72) Inventors: Christopher Stephen Flemming, Shelby Township, MI (US); Paul W. Alexander, Ypsilanti, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 196 days.

(21) Appl. No.: 18/318,929

(22) Filed: May 17, 2023

(65) Prior Publication Data

US 2024/0383319 A1    Nov. 21, 2024

(51) Int. Cl.
  *B60J 7/12* (2006.01)
  *B60J 7/00* (2006.01)
  *B60P 3/34* (2006.01)

(52) U.S. Cl.
  CPC .............. *B60J 7/12* (2013.01); *B60J 7/0092* (2013.01); *B60P 3/34* (2013.01)

(58) Field of Classification Search
  CPC . B60J 7/0092; B60J 7/1256; B60J 7/12; B60J 7/06; B60J 7/141; B60J 7/198; B60J 7/062; B60J 7/08; B60J 7/10; B60J 7/1607; B60J 7/1614; B60R 16/08; B60P 7/02; B60P 7/04; B60P 3/34; B60P 3/341; E04B 1/345

USPC ............. 296/165, 176, 26.04, 26.06, 100.01, 296/100.16, 100.17; 52/2
  See application file for complete search history.

(56) References Cited

U.S. PATENT DOCUMENTS

| | | | | | |
|---|---|---|---|---|---|
| 3,227,486 | A | * | 1/1966 | Scott | B60J 7/1256 296/117 |
| 4,000,585 | A | * | 1/1977 | Denaro | E04H 15/20 135/121 |
| 4,093,302 | A | * | 6/1978 | Adams | B60P 3/34 296/100.18 |
| 4,101,062 | A | * | 7/1978 | Lazar | B60R 9/055 224/314 |
| 4,296,960 | A | * | 10/1981 | Winchester | B60P 3/32 135/88.13 |
| 5,692,795 | A | * | 12/1997 | Mininger | E04H 15/20 296/159 |
| 5,951,095 | A | * | 9/1999 | Herndon | B60J 7/1621 296/100.1 |
| 11,976,487 | B2 | * | 5/2024 | Watts | B60P 3/32 |
| 12,077,977 | B2 | * | 9/2024 | Watts | B60R 9/055 |
| 2018/0326825 | A1 | * | 11/2018 | Mankame | B60J 7/085 |
| 2024/0001747 | A1 | * | 1/2024 | Yerby, Jr. | B60J 11/04 |

* cited by examiner

Primary Examiner — Amy R Weisberg
Assistant Examiner — Denise Lynne Esquivel
(74) Attorney, Agent, or Firm — CANTOR COLBURN LLP

(57) ABSTRACT

A reconfigurable inflatable pickup truck box cover includes a base frame, a side wall system operatively connected to the base frame, and a top wall operatively connected to the side wall system. At least one of the base frame, the side wall system, and the top wall is inflatable.

20 Claims, 10 Drawing Sheets

RECONFIGURABLE INFLATABLE PICKUP TRUCK BOX COVER

INTRODUCTION

The subject disclosure relates to the art of pickup trucks and, more particularly, to a reconfigurable inflatable pickup truck box cover for a pickup truck box.

Many pickup truck owners incorporate a cover into their cargo box. Pickup truck box covers come in a wide array of shapes and sizes. A cover may be as simple as a tarp, or as complex as a hard sided cap that supports a tent. Semi-permanent covers, such as tonneau covers, soft sided caps, hard sided caps, and the like are also available. The semi-permanent covers are attached to pickup truck body components and create an enclosed and protected space in the cargo box. While effective, the semi-permanent covers provide few re-configuration options and are often difficult to remove. Accordingly, it is desirable to provide a cover that is readily reconfigurable and easily removable in order to allow users a greater number of options for using the box.

SUMMARY

A reconfigurable inflatable pickup truck box cover, in accordance with a non-limiting example, includes a base frame, a side wall system operatively connected to the base frame, and a top wall operatively connected to the side wall system. At least one of the base frame, the side wall system, and the top wall is inflatable.

In addition to one or more of the features described herein the base frame includes a first side member, a second side member arranged opposite to the first side member, and a first end member that connects the first side member and the second side member, each of the first side member and the second side member including an inflatable latching member.

In addition to one or more of the features described herein the side wall system includes a first side wall portion and a second side wall portion, the first side wall portion being connected to the second side wall portion.

In addition to one or more of the features described herein the first side wall portion is connected to the base frame and includes a front wall, a first side wall section, and a second side wall section, wherein each of the front wall, the first side wall section, and the second side wall section are inflatable.

In addition to one or more of the features described herein the second side wall portion is connected to the top wall and includes a rear wall, a third side wall section, and a fourth side wall section, wherein each of the rear wall, the third side wall section, and the fourth side wall section are inflatable.

In addition to one or more of the features described herein the rear wall includes a first edge pivotally connected to the top wall and a second edge, the second edge including second end member of the base frame.

In addition to one or more of the features described herein the first side wall portion is fluidically isolated from the second side wall portion.

In addition to one or more of the features described herein an inflation manifold fluidically connected to the base frame, the top wall, and the side wall system.

A vehicle, in accordance with a non-limiting example, includes a body defining a passenger compartment and a cargo box including an upper peripheral edge, and a reconfigurable inflatable pickup truck box cover supported on the cargo box. The reconfigurable inflatable pickup truck box cover includes a base frame supported on the upper peripheral edge of the cargo box, a side wall system operatively connected to the base frame, and a top wall operatively connected to the side wall system, wherein at least one of the base frame, the side wall system, and the top wall is inflatable.

In addition to one or more of the features described herein the base frame includes a first side member, a second side member arranged opposite to the first side member, and a first end member that connects the first side member and the second side member, each of the first side member and the second side member including a latching member that engages the cargo box.

In addition to one or more of the features described herein the side wall system includes a first side wall portion and a second side wall portion, the first side wall portion being connected to the second side wall portion.

In addition to one or more of the features described herein the first side wall portion is connected to the base frame and includes a front wall, a first side wall section, and a second side wall section, wherein each of the front wall, the first side wall section, and the second side wall section are inflatable.

In addition to one or more of the features described herein the second side wall portion is connected to the top wall and includes a rear wall, a third side wall section, and a fourth side wall section, wherein each of the rear wall, the third side wall section, and the fourth side wall section are inflatable.

In addition to one or more of the features described herein the rear wall includes a first edge pivotally connected to the top wall and a second edge, the second edge including second end member of the base frame.

In addition to one or more of the features described herein the first side wall portion is fluidically isolated from the second side wall portion.

In addition to one or more of the features described herein an inflation manifold fluidically connected to the base frame, the top wall, and the side wall system.

A method of configurating a cover for a pickup truck cargo box, in accordance with a non-limiting example, includes selecting one of a plurality of cover configurations, activating a pump to create a compressed fluid, passing the compressed fluid into one of a plurality of cover components including a base frame, a side wall system, and a top wall in order to establish the one of the plurality of cover configurations.

In addition to one or more of the features described herein wherein establishing the one of the plurality of cover configurations includes inflating the base frame and the top wall to form a tonneau configuration.

In addition to one or more of the features described herein wherein establishing the one of the plurality of cover configurations includes inflating the base frame and a forward portion of the side wall system to form a fast back configuration.

In addition to one or more of the features described herein wherein establishing the one of the plurality of cover configurations includes inflating the base frame and a rear portion of the side wall system to form a cap configuration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
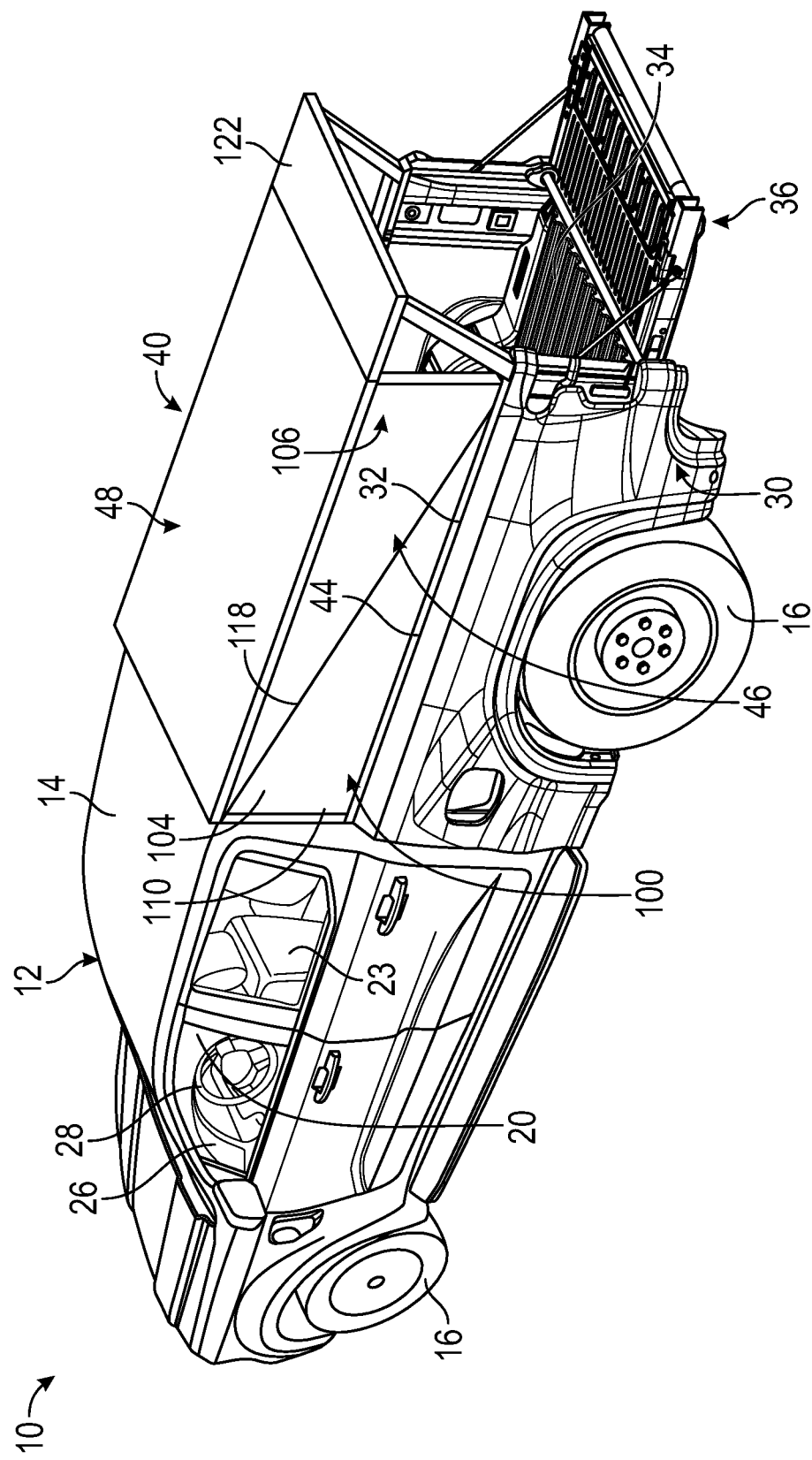
FIG. 1 is a left rear perspective view of a vehicle including an inflatable box cover, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 takes the form of a pickup truck 12 including a body 14 supported on a plurality of wheels 16. Body 14 defines a passenger compartment 20 within which are arranged seats 23 positioned behind a dashboard 26. A steering mechanism 28 is arranged between seat 23 and dashboard 26. Body 14 further includes a cargo box 30 having an upper peripheral edge 32, a cargo bed 34, and a tailgate 36. In accordance with a non-limiting example, a reconfigurable, inflatable pickup truck box cover 40 is supported on upper peripheral edge 32 of cargo box 30.

Figure 2:
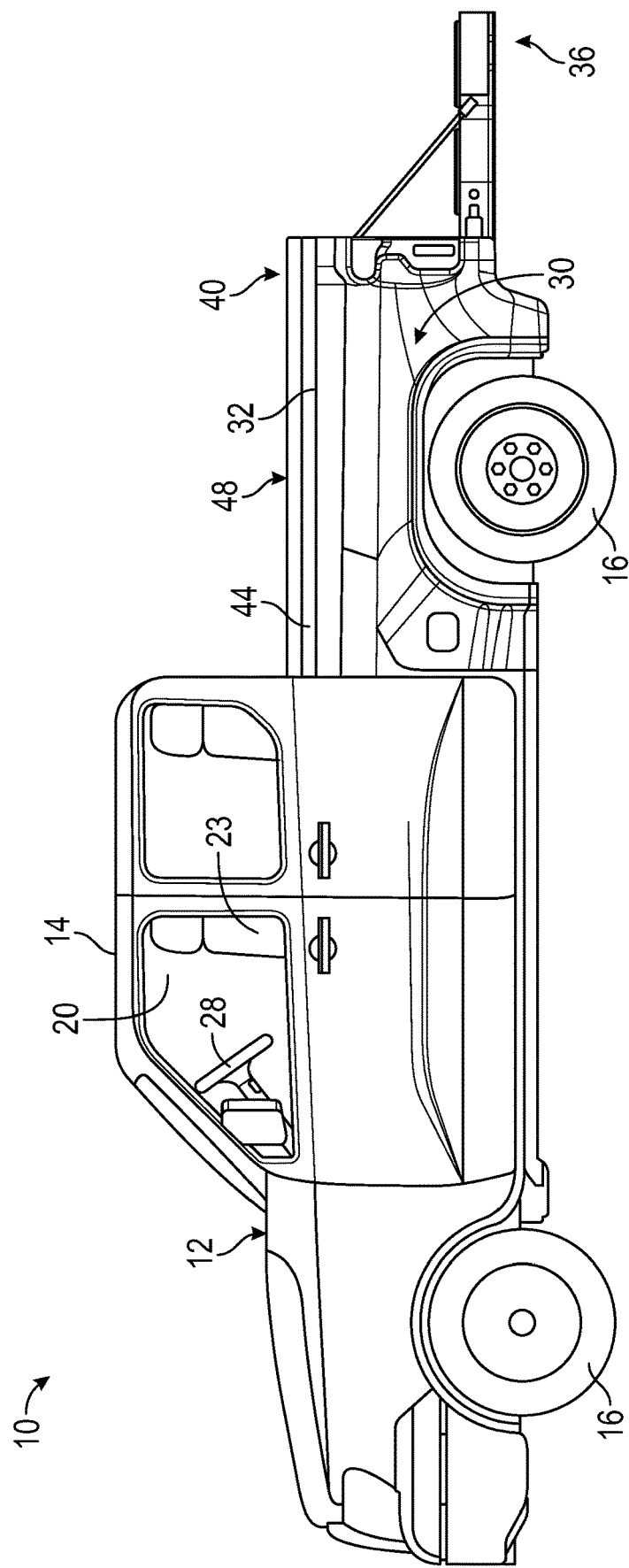
FIG. 2 is a left side view of the inflatable box cover of FIG. 1 in a deflated state, in accordance with a non-limiting example.
Figure 3:
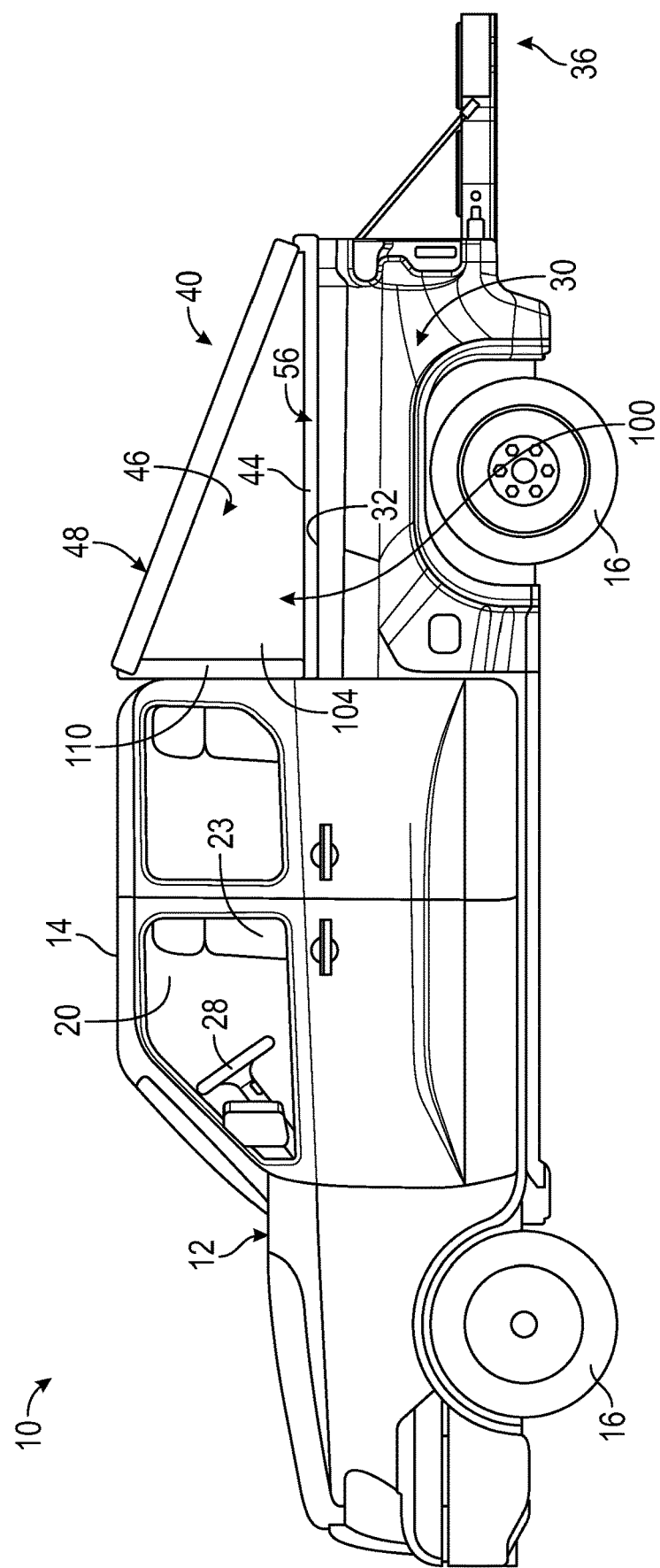
FIG. 3 is a left side view of the inflatable box cover of FIG. 2, in a partially inflated state, in accordance with a non-limiting example.
Figure 4:
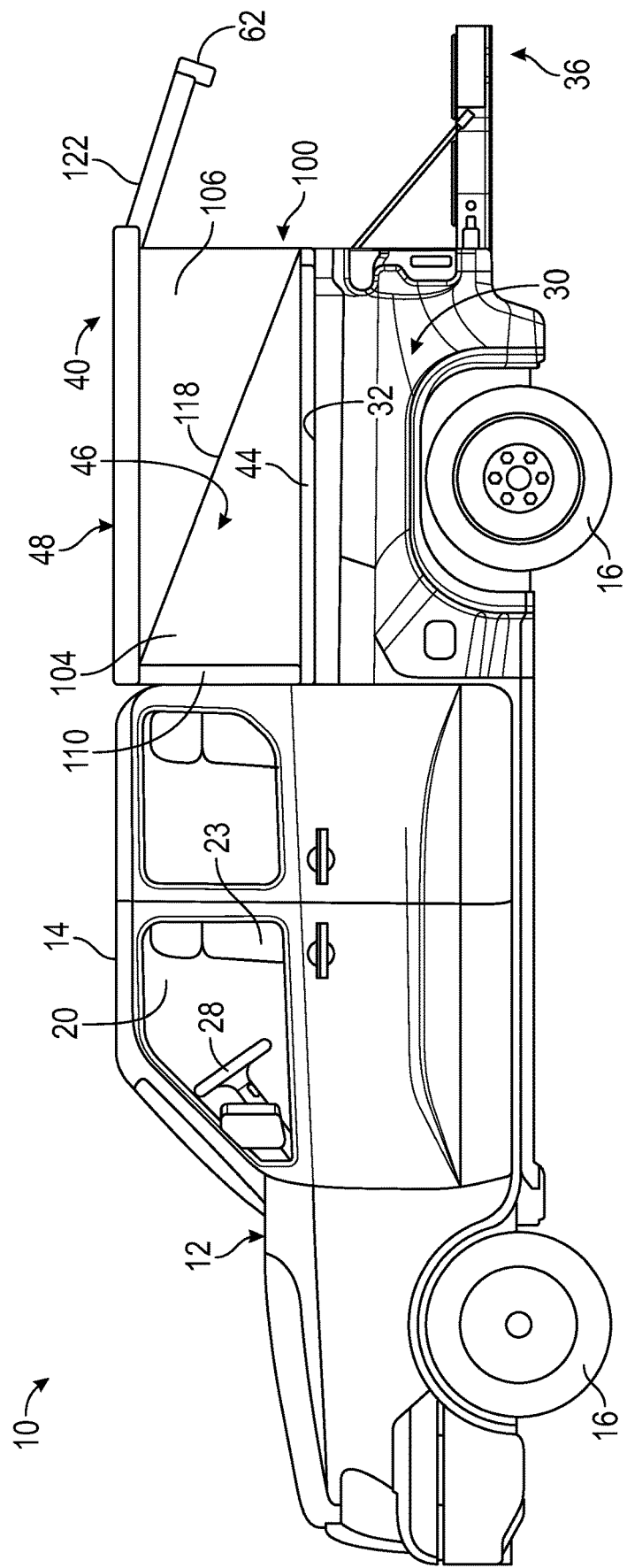
FIG. 4 is a left side view of the inflatable box cover of FIG. 3 in a fully inflated state, in accordance with a non-limiting example.

In a non-limiting example illustrated in FIGS. 2, 3 and 4, reconfigurable, inflatable pickup truck box cover 40 includes a base frame 44, a side wall system 46 operatively connected to base frame 44, and a top wall 48 operatively connected to side wall system 46. Reconfigurable, inflatable pickup truck box cover 40 may be folded and readily stowed in cargo box 30 and/or inflated, FIGS. 3 and 4, to serve as a cover that extends over cargo box 30. In a non-limiting example, base frame 44, side wall system 46, and top wall 48 include inflatable bladders (not separately labeled) that may receive an amount of pressurized air to establish the various cover configurations.

Controlling air flow to reconfigurable, inflatable pickup truck box cover 40 allows a user to establish a number of different cover configurations. For example, reconfigurable, inflatable pickup truck box cover 40 may be arranged in a cap configuration as shown in FIGS. 1 and 4, a tonneau configuration as shown in FIG. 2, and/or a fast back configuration as shown in FIG. 3.

Figure 5:
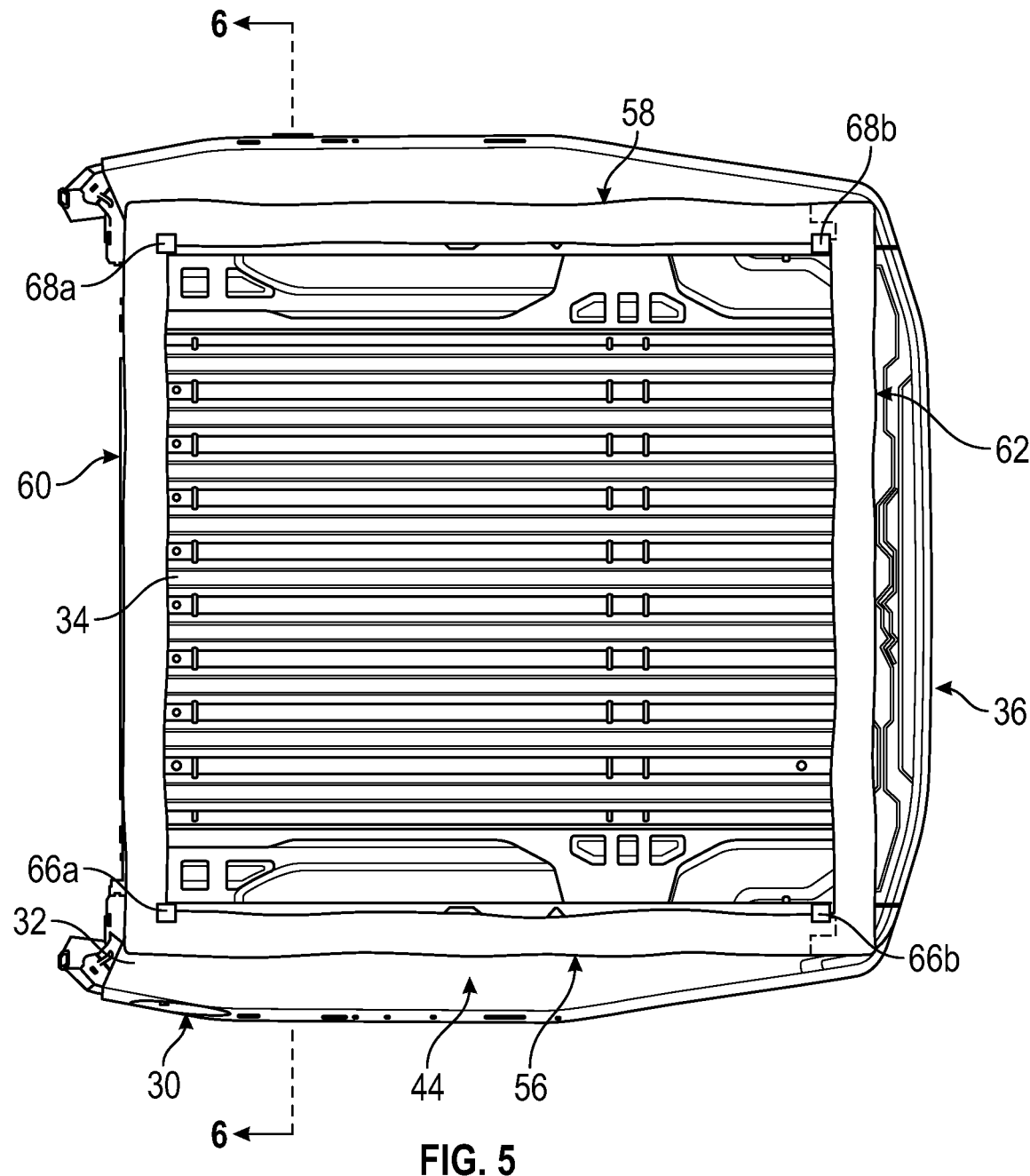
FIG. 5 is a top view of a pickup truck box depicting connector elements that secure the inflatable box cover of FIG. 2 to the vehicle, in accordance with a non-limiting example.

In accordance with a non-limiting example shown in FIG. 5, base frame 44 includes a first side member 56, a second side member 58 that is opposite to first side member 56, a first end or front member 60 and a second end or rear member 62. First side member 56 includes a first locating clip 66a and a second locating clip 66b and second side member 58 includes a third locating clip 68a and a fourth locating clip 68b. Locating clips 66a, 66b, 68a, and 68b engage with structure on upper peripheral edge 32 of pickup box 30 to establish a selected orientation of base frame 44 on cargo box 30. Base frame 44 may include additional connecting structure as will be detailed herein.

Figure 6:
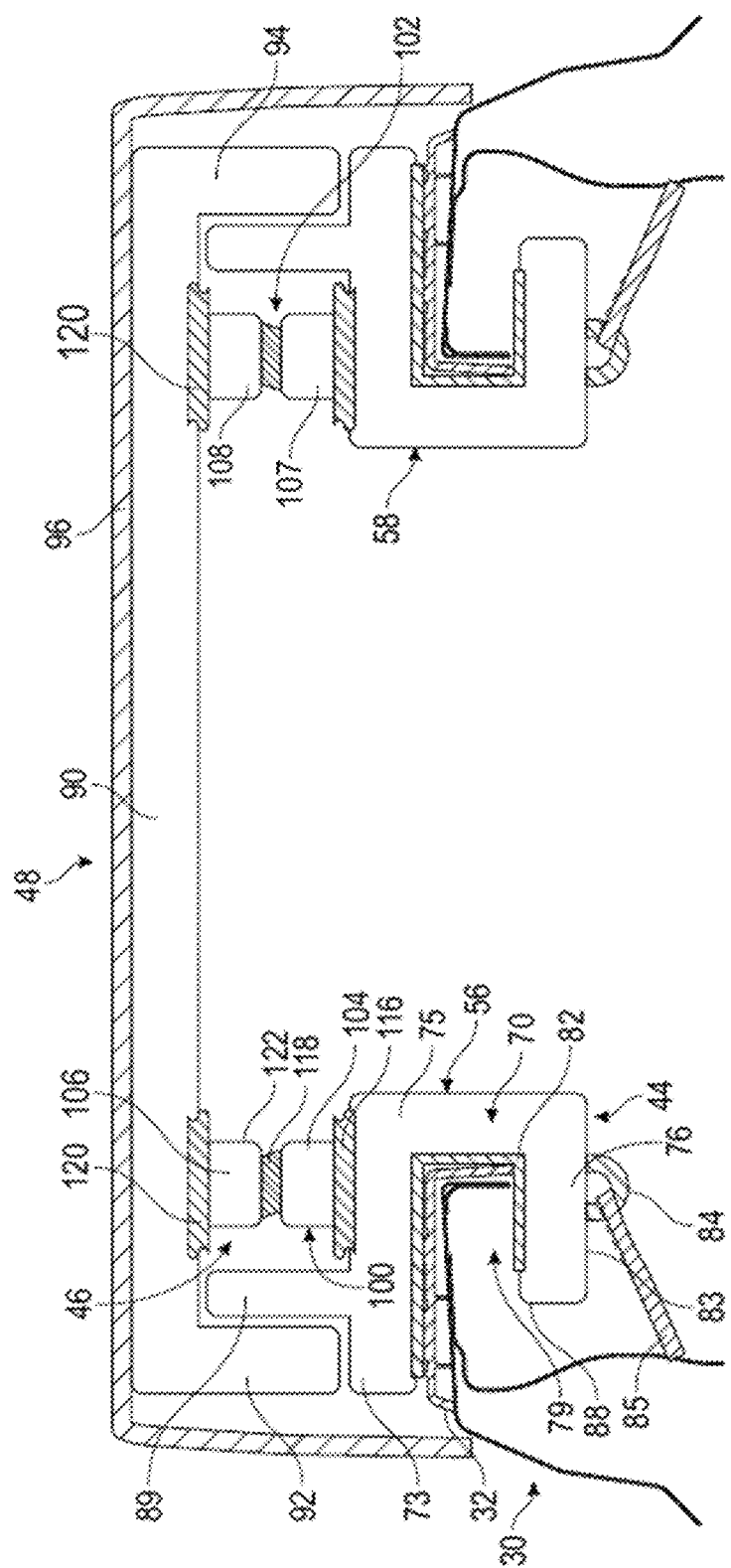
FIG. 6 is a cross-sectional view of the inflatable box cover of FIG. 5, taken through the line 6-6 of FIG. 5, depicting an inflatable latch member prior to inflation, in accordance with a non-limiting example.
Figure 7:
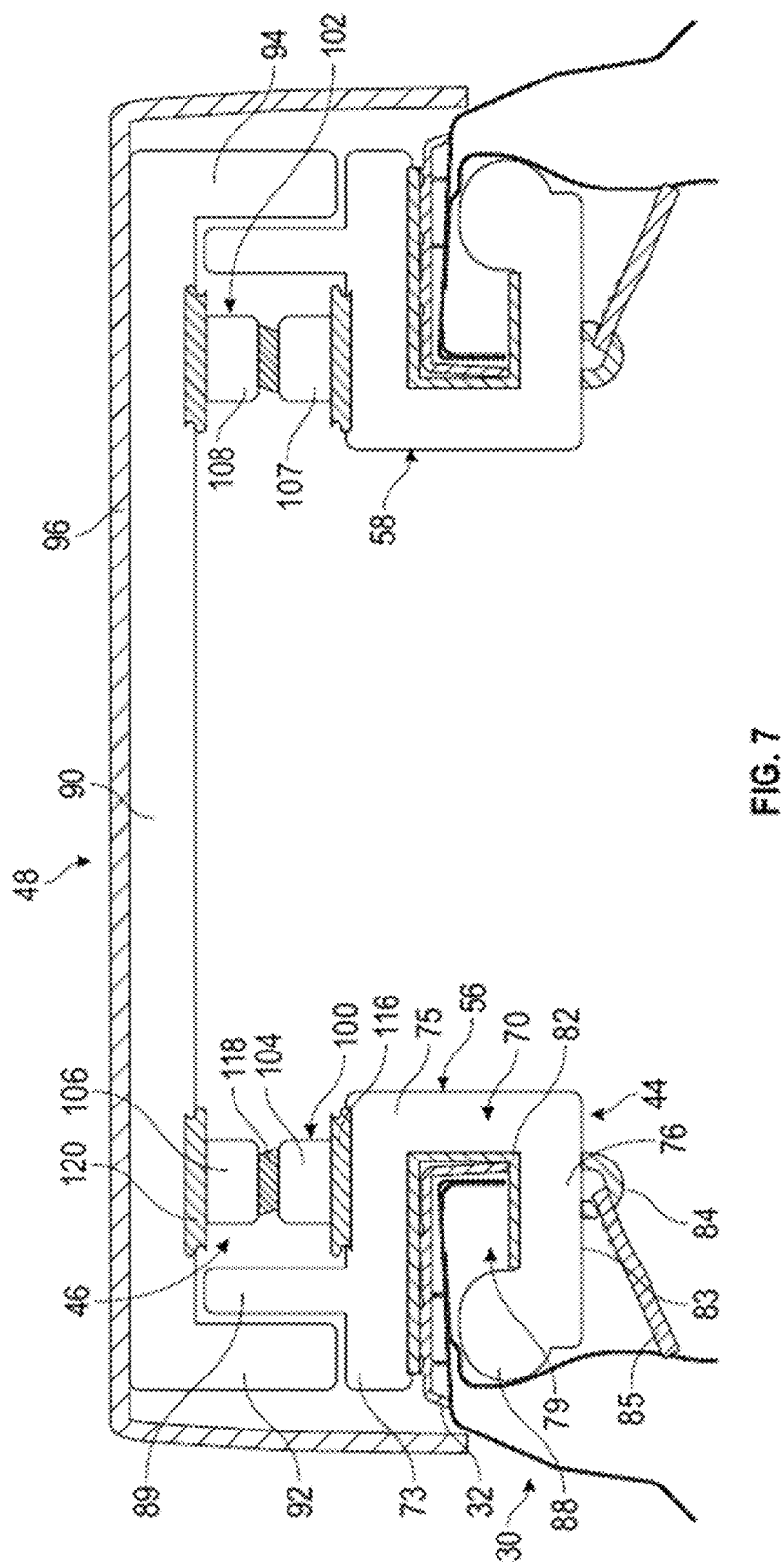
FIG. 7 is a cross-sectional view of the inflatable box cover of FIG. 6 depicting the inflatable latch member after inflation, in accordance with a non-limiting example.

Reference will now follow to FIGS. 6 and 7, with continued reference to FIG. 5 in describing first side member 56 of base member 44 with an understanding that second side member 58, first end member 60, and second end member 62 include corresponding structure. First side member 56 defines an inflatable rail 70 including a first portion 73 that rests on upper peripheral edge 32 of cargo box 30, a second portion 75 that extends downwardly from first portion 73 into cargo box 30, and a third portion 76 that projects under upper peripheral edge 32. Third portion 76 is spaced from first portion 73 so as to form a channel 79 that is receptive of upper peripheral edge 32. A seal 82 is arranged in channel 79. Seal 82 engages upper peripheral edge 32 to impede ingress of fluids and dirt.

In a non-limiting example, third portion 76 includes an outer surface 83 that supports an attachment member or ring 84. Attachment member 84, together with a tether 85 is employed to secure base frame 44 to cargo box 30. In addition to attachment member 84, first side member 56 includes an inflatable latch member 88 formed as part of third portion 76 as shown in FIG. 7. Inflatable latch member 88, when expanded, engages an underside of upper peripheral edge 32 and creates a clamping force between base frame 44 and cargo box 30.

In a non-limiting example, first portion 73 includes an upwardly projecting inflatable flange member 89 which, as will be detailed herein, supports top wall 48. Top wall 48 includes a first panel 90 that extends across cargo box 30, a second panel 92 that extends from first panel 90 toward first side member 56 and a third panel 94 that extends from first panel 90 toward second side member 58. Additional panels (not separately labeled) may project from first panel 90 toward first end member 60 and second end member 62. First panel 90, second panel 92, and third panel 94 are inflatable. A cover 96 may be placed over top wall 48.

In addition to base frame 44 and top wall 48 being inflatable, side wall system 46 also includes inflatable components. In a non-limiting example, side wall system 46 includes a first side wall 100 and a second side wall 102 that is opposite first side wall 100. First side wall 100 includes a first side wall portion 104 and a second side wall portion 106. First side wall portion 104 and second side wall portion 106 are independently inflatable so as to create different configurations for reconfigurable inflatable pickup truck box cover 40. Second side wall 102 includes a third side wall portion 107 and a fourth side wall portion 108, FIG. 6.

Reference will follow to FIGS. 3, 4, and 6 in describing first side wall 100 with an understanding that second side wall 102 includes similar structure. First side wall portion 104 is coupled to base frame 44 and includes a front wall 110. A first interface layer 116 is positioned between and connects first side wall portion 104 and base frame 44. Front wall 110 connects between base frame 44 and top wall 48. Second side wall portion 106 connects between first side wall portion 104 and top wall 48.

Figure 8:
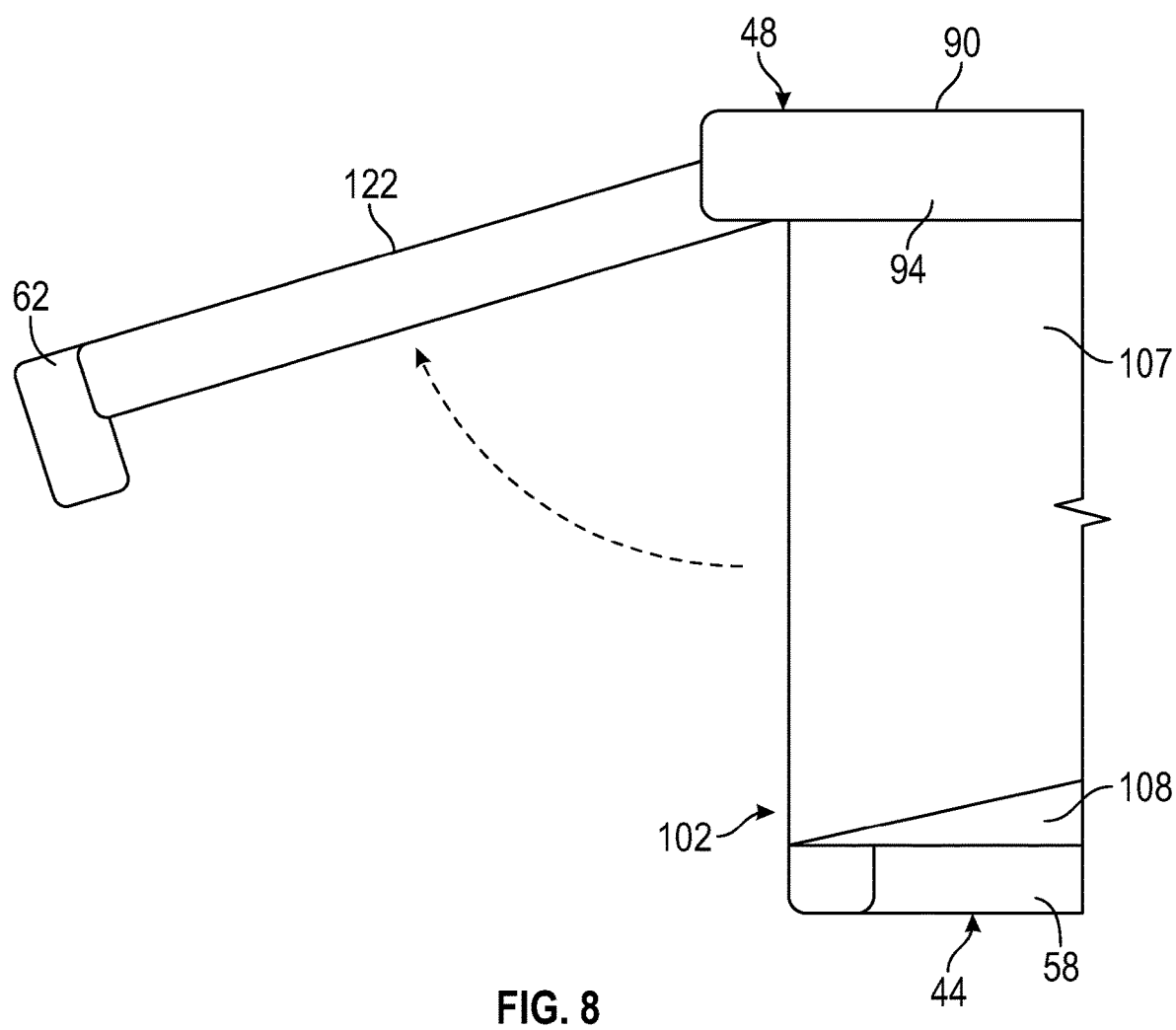
FIG. 8 depicts a rear hatch of the inflatable box cover of FIG. 4, shown in an open configuration, in accordance with a non-limiting example.

Second side wall portion 106 is connected to first side wall portion 104 through a second interface layer 118 and to top wall 48 through a third interface layer 120. Second side wall portion 106 includes a rear wall 122 which may define a hatch (not separately labeled) that may pivot relative to top wall 48 (FIG. 8). First and second side wall portions 104 and 106 include mating angled surfaces that extend from top wall 48 toward upper peripheral edge 32 adjacent to tailgate 36. Further, although not shown, first side wall 100 may be pivotally mounted to top wall 48. That is, first side wall 100 may form a side door (not separately labeled) of inflatable pickup truck box cover 40 that provides additional access to cargo box 30.

Figure 9:
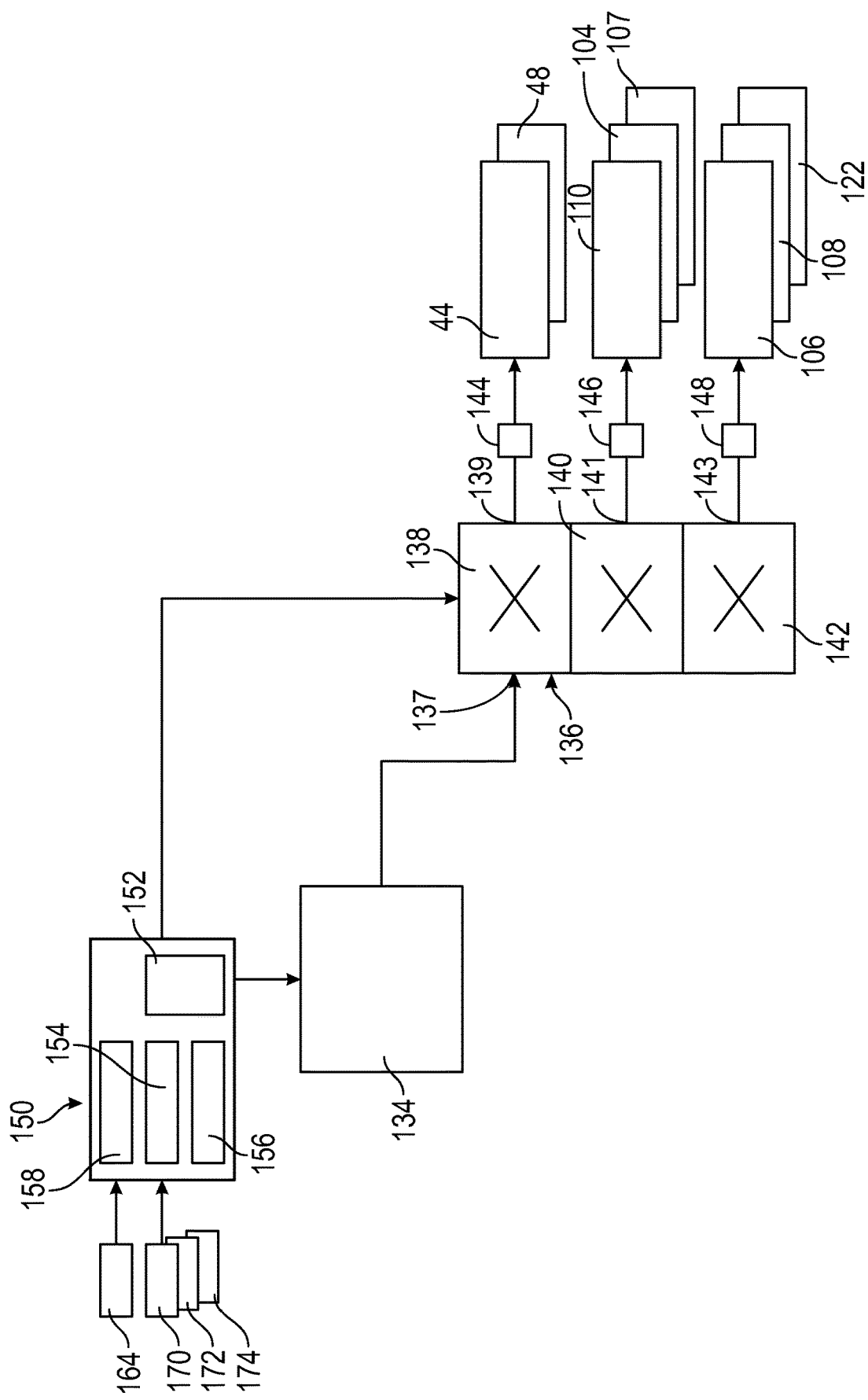
FIG. 9 is a schematic view of an inflation system for the inflatable box cover, in accordance with a non-limiting example.

In a non-limiting example, illustrated in FIG. 9, vehicle 10 includes a pump 134 that is fluidically connected to base frame 44, side wall system 46, and top wall 48 through a manifold 136. Manifold 136 includes an inlet 137 that feeds a plurality of valves. A first valve 138 is connected to inlet 137 and includes a first outlet 139. A second valve 140 is connected to inlet 137 and includes a second outlet 141, and a third valve 142 is connected to inlet 137 and includes a third outlet 143. First outlet 139 is fluidically connected to base frame 44 and top wall 48 via a first check valve 144. Second outlet 141 is fluidically connected to front wall 110, first side wall portion 104 and third side wall portion 107, via a second check valve 146, and third outlet 143 is fluidically connected to second side wall portion 106, fourth side wall portion 108, and rear wall 122 via a third check valve 148.

In a non-limiting example shown in FIG. 9, a controller 150 is operatively connected to pump 134 and manifold 136. Controller 150 includes a central processing unit (CPU) 152, a non-volatile memory 154, a pump controller 156, and a valve actuator 158. A cover configuration selector or actuator 164 is connected to controller 150 as are a plurality of pressure sensors 170, 172, and 174. A user may select a particular cover configuration through controller 150. Once selected, pump controller 156 and valve actuator 158 selectively operate pump 134 and manifold 136 to control inflation of base frame 44, side wall system 46 and/or top wall 48.

Figure 10:
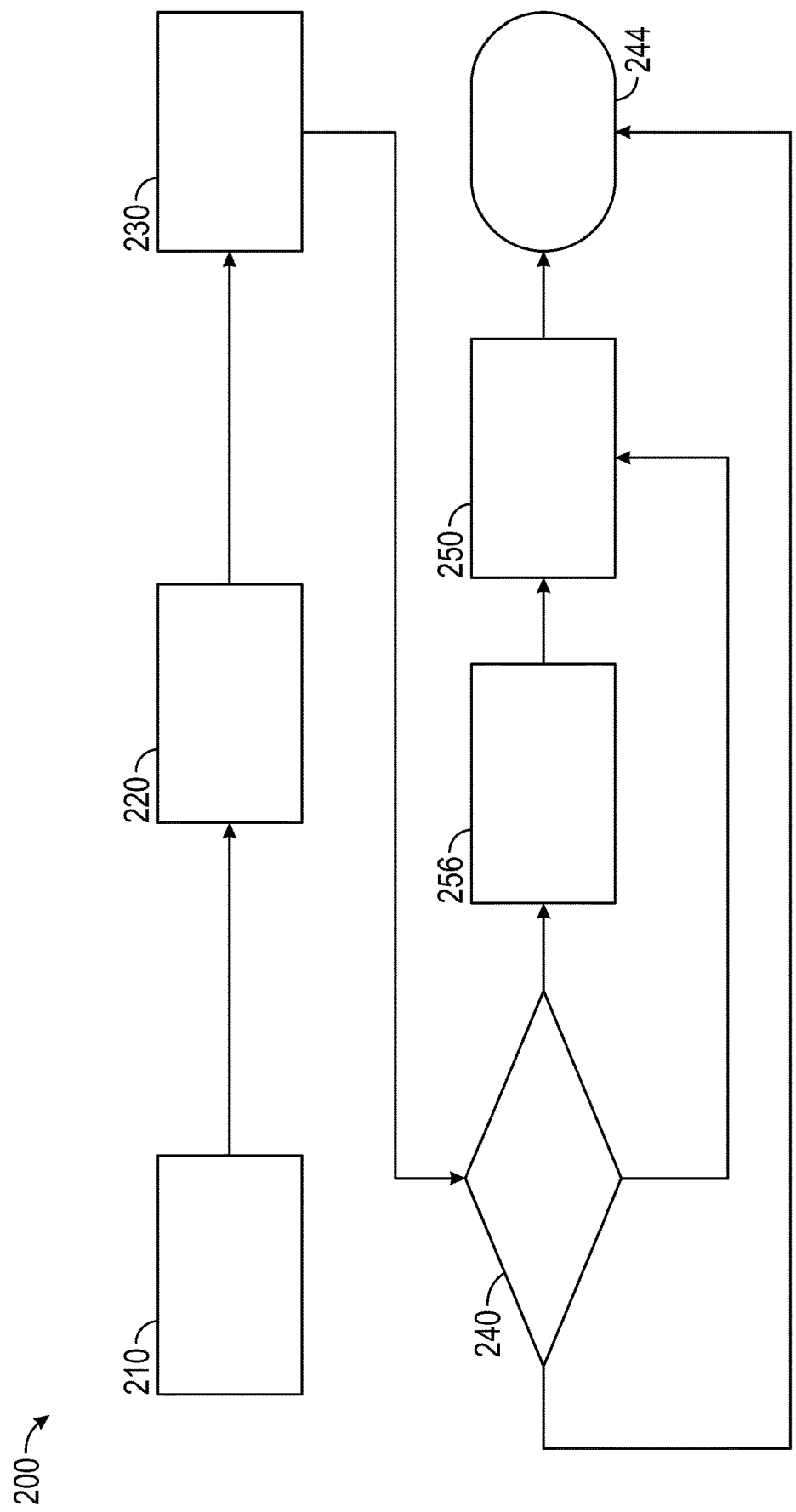
FIG. 10 is a flow chart illustrating a method of inflating the inflatable box cover, in accordance with a non-limiting example.

Reference will now follow to FIG. 10 in describing a method 200 of establishing one of a plurality of configurations for reconfigurable, inflatable pickup truck box cover 40. In block 210 reconfigurable, inflatable pickup truck box cover 40 is laid out in cargo box 30. In block 220, locating clips 66a, 66b, 68a, and 68b on base frame 44 are connected to upper peripheral edge 32 of cargo box 30. Base frame 44 including inflatable latch member 88 and top wall 48 are inflated in block 230. In block 240, a determination is made by controller 150 which reconfigurable, inflatable pickup truck box cover 40 configuration has been selected.

If a tonneau selection is made in block 240, inflation is complete in block 244 once base frame 44 and top wall 48 are inflated. Inflation pressures may be set in non-volatile memory 154 or may be determined by one or more of pressure sensors 170, 172, and 174. If a fast back configuration is selected, in addition to inflating base frame 44 and top wall 48, controller 150 inflates first side wall portion 104 and third sidewall portion 107 in block 250. If a full cap configuration is selected in block 240, in addition to inflating base frame 44, top wall 48 and first side wall portion 104 and third side wall portion 107, controller 150 also inflates second side wall portion 106 and fourth side wall portion 108 in block 256. At this point, it should be understood that reconfigurable, inflatable pickup truck box cover 40 represents a convenient system for protecting items in a cargo box while being readily removeable, and storable.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A reconfigurable inflatable pickup truck box cover comprising:
 a base frame;
 a side wall system operatively connected to the base frame; and
 a top wall operatively connected to the side wall system, wherein at least one of the base frame, the side wall system, and the top wall is inflatable,
 wherein the base frame includes a first side member, a second side member arranged opposite to the first side member, and a first end member that connects the first side member and the second side member, each of the first side member and the second side member including an inflatable latching member.

2. The reconfigurable inflatable pickup truck box cover according to claim 1, wherein the side wall system includes a first side wall portion and a second side wall portion, the first side wall portion being connected to the second side wall portion.

3. The reconfigurable inflatable pickup truck box cover according to claim 2, wherein the first side wall portion is connected to the base frame and includes a front wall, a first side wall section, and a second side wall section, wherein each of the front wall, the first side wall section, and the second side wall section are inflatable.

4. The reconfigurable inflatable pickup truck box cover according to claim 3, wherein the second side wall portion is connected to the top wall and includes a rear wall, a third side wall section, and a fourth side wall section, wherein each of the rear wall, the third side wall section, and the fourth side wall section are inflatable.

5. The reconfigurable inflatable pickup truck box cover according to claim 4, wherein the rear wall includes a first edge pivotally connected to the top wall and a second edge, the second edge including second end member of the base frame.

6. The reconfigurable inflatable pickup truck box cover according to claim 4, wherein the first side wall portion is fluidically isolated from the second side wall portion.

7. The reconfigurable inflatable pickup truck box cover according to claim 1, further comprising an inflation manifold fluidically connected to the base frame, the top wall, and the side wall system.

8. A vehicle comprising:
a body defining a passenger compartment and a cargo box including an upper peripheral edge; and
a reconfigurable inflatable pickup truck box cover supported on the cargo box, the reconfigurable inflatable pickup truck box cover comprising:
a base frame supported on the upper peripheral edge of the cargo box;
a side wall system operatively connected to the base frame; and
a top wall operatively connected to the side wall system, wherein at least one of the base frame, the side wall system, and the top wall is inflatable,
wherein the base frame includes a first side member, a second side member arranged opposite to the first side member, and a first end member that connects the first side member and the second side member, each of the first side member and the second side member including an inflatable latching member.

9. The vehicle according to claim 8, wherein the inflatable latching member is configured to engage the cargo box.

10. The vehicle according to claim 8, wherein the side wall system includes a first side wall portion and a second side wall portion, the first side wall portion being connected to the second side wall portion.

11. The vehicle according to claim 10, wherein the first side wall portion is connected to the base frame and includes a front wall, a first side wall section, and a second side wall section, wherein each of the front wall, the first side wall section, and the second side wall section are inflatable.

12. The vehicle according to claim 11, wherein the second side wall portion is connected to the top wall and includes a rear wall, a third side wall section, and a fourth side wall section, wherein each of the rear wall, the third side wall section, and the fourth side wall section are inflatable.

13. The vehicle according to claim 12, wherein the rear wall includes a first edge pivotally connected to the top wall and a second edge, the second edge including second end member of the base frame.

14. The vehicle according to claim 12, wherein the first side wall portion is fluidically isolated from the second side wall portion.

15. The vehicle according to claim 8, further comprising an inflation manifold fluidically connected to the base frame, the top wall, and the side wall system.

16. A method of configuring a cover for a pickup truck cargo box, the method comprising:
selecting one of a plurality of cover configurations;
activating a pump to create a compressed fluid; and
passing the compressed fluid into one of a plurality of cover components including a base frame, a side wall system, and a top wall in order to establish the one of the plurality of cover configurations,
wherein establishing the one of the plurality of cover configurations includes inflating the base frame and a forward portion of the side wall system to form a fast back configuration.

17. The method of claim 16, wherein establishing the one of the plurality of cover configurations includes inflating the base frame and the top wall to form a tonneau configuration.

18. The method of claim 16, wherein establishing the one of the plurality of cover configurations includes inflating the base frame and a rear portion of the side wall system to form a cap configuration.

19. The reconfigurable inflatable pickup truck box cover according to claim 2, wherein the first side wall portion and the second side wall portion are connected at an second interface layer that extends at an angle from the top wall towards the base frame.

20. The vehicle according to claim 10, wherein the first side wall portion and the second side wall portion are connected at a second interface layer that extends at an angle from the top wall towards the base frame.

* * * * *